Oct. 28, 1969  D. IORDANIDIS  3,474,886
OVERSPEED CONTROL MEANS

Filed July 28, 1967  2 Sheets-Sheet 1

INVENTOR
DEMETRE IORDANIDIS
BY
Maybee & Legris
ATTORNEYS

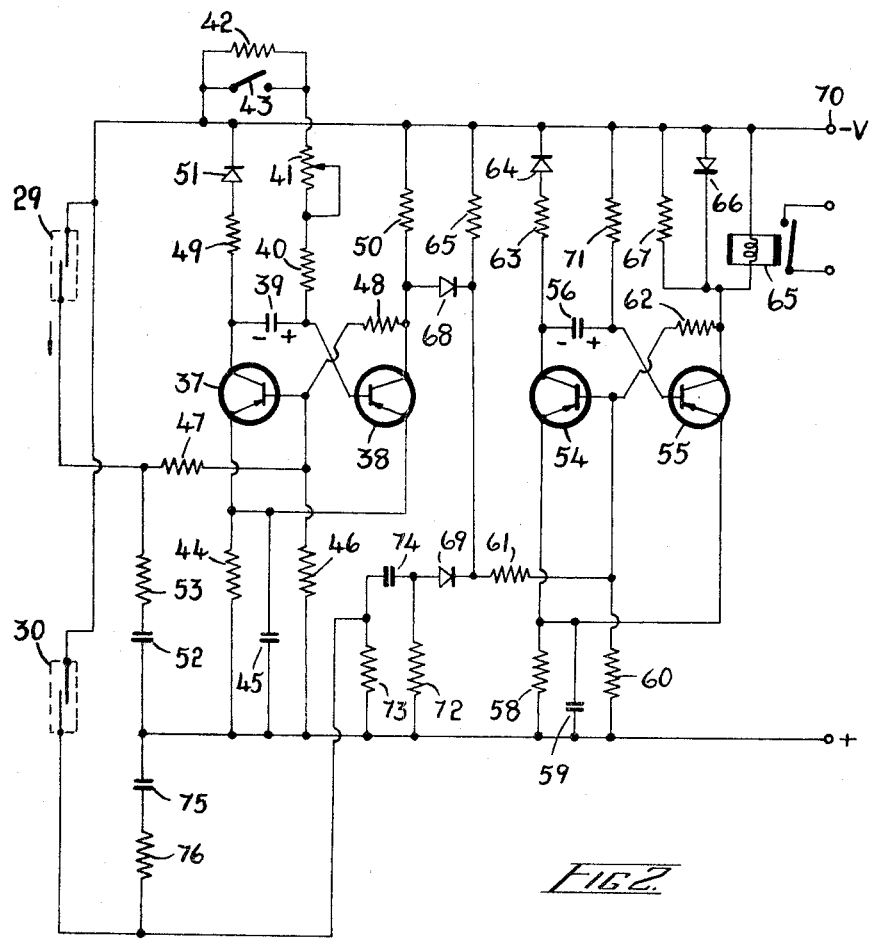
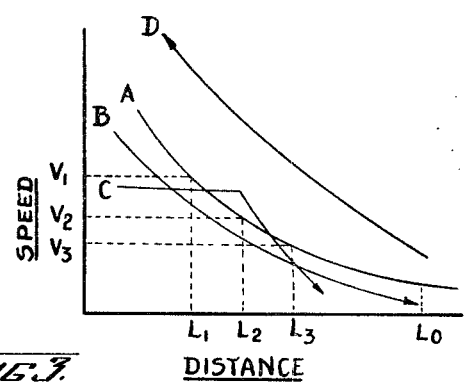

United States Patent Office
3,474,886
Patented Oct. 28, 1969

3,474,886
OVERSPEED CONTROL MEANS
Demetre Iordanidis, Toronto, Ontario, Canada, assignor, by mesne assignments, to Dover Corporation, New York, N.Y., a corporation of Delaware
Filed July 28, 1967, Ser. No. 656,757
Int. Cl. B66b 1/00
U.S. Cl. 187—29                                    14 Claims

ABSTRACT OF THE DISCLOSURE

In a system comprising a body, such as an elevator car, which is constrained to move along a predetermined path, monitoring means are provided along said path for detecting overspeed of the body. Each monitoring means comprises a series of speed sensing devices spaced apart along the path, the speed sensing devices being responsive to movement of the body in one direction at speeds exceeding respective, successively decreasing, critical speeds in accordance with which the time constants of the speed sensing devices are adjusted. Each speed sensing device comprises essentially a pair of sensing switches located in the path of the body, a pair of pulse forming circuits operated by the sensing switches, an AND circuit, a two-state switching circuit, and an output circuit. The pulse forming circuits are adapted to produce pulses, when triggered by the sensing switches, of different durations. If the body is moving at a speed exceeding the critical speed, the second sensing switch will be operated within the duration of the pulse produced by the first warning circuit, and two pulses will occur simultaneously; the switching circuit is coupled to the pulse forming circuits through the AND circuit and is operated by the simultaneous occurrence of the pulses to cause the output circuit to send a signal to a detecting or control device.

BACKGROUND OF THE INVENTION

This invention relates to control means responsive to overspeed of a body moving in a predetermined direction along a path for controlling or checking the movement of the body in its approach towards a limit position. The invention is primarily applicable to elevator systems, especially high speed elevator systems, and is described herein with particular reference to such a system; it will be readily understood, however, that the invention has wider applications, and can be applied to hoist control, conveyor control, electric train control or any system including a body constrained to move along a predetermined path and means for limiting the movement of the body at a particular region of the path.

In a high speed elevator system, limit switches are normally provided towards the upper and lower ends of an elevator shaft for operating an emergency brake to stop the elevator car should the car for any reason move beyond the safe normal working region of the shaft. The shaft must be extended for a considerable distance beyond the limit switches, to allow a reasonable distance within which the car can be brought to a stop after the brake is applied, and the higher the normal working speed of the elevator system, the longer the extensions must be in order to provide the requisite braking distance.

It is an object of the present invention to provide means for monitoring the speed of a body, such as an elevator car for example, in its approach towards a predetermined or limit position to ensure that the body does not arrive at that position at a speed exceeding a maximum safe speed. In an elevator system, by limiting the speed at which an elevator car can approach a limit switch, the shaft extensions beyond the limit switches can be considerably reduced with safety.

Summary of the invention

In accordance with the invention, control means responsive to overspeed of a body moving in a predetermined direction along a path towards a limit position comprises unidirectional speed sensing means located in the path at a predetermined position in advance of the limit position, the speed sensing means being operable by movement of the body past the predetermined position at a speed in excess of a maximum safe speed or critical speed, and braking means responsive to operation of the sensing means for arresting movement of the body. Preferably, a plurality of unidirectional speed sensing means spaced apart along the path at positions in advance of the limit position, the speed sensing means being operable by movement of the body past the predetermined positions at speeds in excess of respective, successively decreasing, critical speeds. Each speed sensing means may comprise a pair of sensing switches spaced apart along the path, the sensing switches being successively operable by passage of the body, first and second circuit means connected respectively to the sensing switches and operable thereby to produce, respectively, a first pulse of predetermined duration and a second pulse of shorter duration than the first, a two-state switching circuit connected to the circuit means through an AND circuit, and output means operable in accordance with the switching circuit, which changes from a first state to a second state when the first and second pulses occur simultaneously.

It will be noted that the first pulse always commences before the second pulse; in this specification the term "simultaneous occurrence" of the first and second pulses means commencement of the second pulse within the predetermined duration of the first pulse so that there is a time during which the two pulses co-exist.

The "critical speed" for any one speed sensing means is, of course, determined by the ratio of the spacing between the sensing switches to the duration of the first pulse. It will be seen that since the second pulse is of shorter duration than the first pulse, the body can accelerate in the opposite direction at speeds higher than the critical speed without causing the braking means to operate.

BRIEF DESCRIPTION OF THE DRAWINGS

One embodiment of the invention, as applied to a high speed elevator system, will now be described by way of example with reference to the accompanying drawings, in which:

FIGURE 2 is a circuit diagram of a speed sensing means illustrated in FIGURE 1; and FIGURE 3 is a diagram illustrating the speed/distance relationship of the elevator under different conditions.

DESCRIPTION OF THE PREFERRED EMBODIMENT

Figure 1:
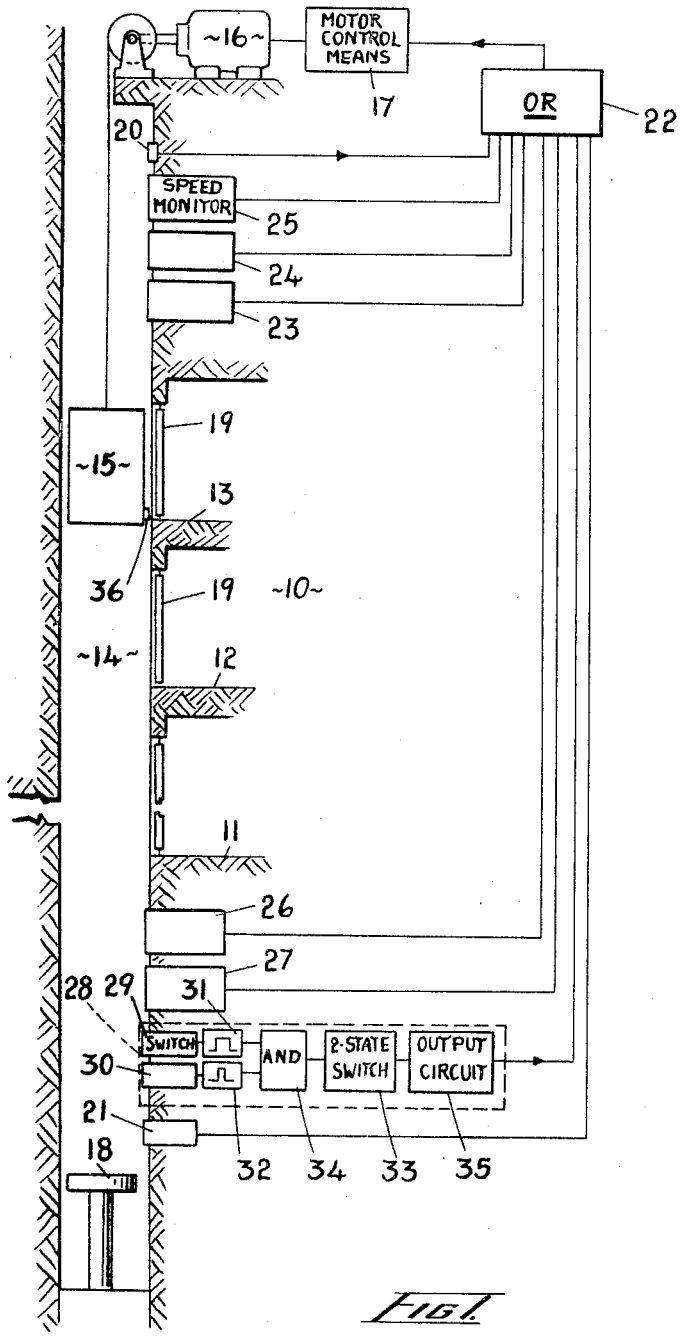
FIGURE 1 is a schematic diagram of an elevator system including overspeed protective means according to the invention.

Referring to FIGURE 1, a structure 10 such as a building having a number of floors 11, 12, 13 etc. is provided with an elevator shaft 14 in which an elevator car 15 operates between the different floors. The car 15 is driven by an electric motor 16 controlled by motor control means 17. A safety stop 18 of conventional form is provided at the bottom of the shaft in the known manner, and a similar stop may be provided towards the top of the shaft. Access to the elevator car from the various floors is provided by the usual sliding gates 19.

The control means 17 includes the usual speed and torque control means and braking means which is responsive to appropriate call signals for stopping the car at selected floors and for effecting rapid braking under emergency conditions. Limit switches 20 and 21 are provided towards the upper and lower ends of the elevator shaft 14; these switches are operative by passage of the car to transmit control signals to the braking means for applying a rapid braking action on the motor before the car can reach its end stops. Each limit switch 20, 21 is connected to the braking means via an OR circuit 22. It will be appreciated that each of the safety stops at the ends of the shaft must permit movement of the car along an extension of the shaft through a distance not less than that required for the car to come to rest, from the maximum speed envisaged, after the brake is applied. In order to ensure that the car shall not reach the limit switch at a speed exceeding that maximum speed, speed monitoring means are provided at the upper and lower parts of the shaft just before the limit switches. Each of the speed monitoring means comprises a plurality of unidirectional speed sensing means 23, 24, 25 (in the case of the upper speed monitoring means and 26, 27, 28 (in the case of the lower speed monitoring means) spaced apart along the elevator shaft at predetermined positions in advance of the position of the limit switch. At each of the predetermined positions there is a certain speed, herein called the critical speed, which is the maximum permissible speed of the car for that position when moving towards the nearest limit switch. The speed sensing means are arranged to be successively operable by passage of the car through those positions at speeds in excess of respective, successively decreasing, critical speeds, each sensing means being operable to transmit a control signal to the braking means via the OR circuit 22.

As shown in diagrammatic form in FIGURE 1, the speed sensing means 28 comprises first and second sensing switches 29, 30 spaced apart along the shaft, the first sensing switch being located in advance of the second, first circuit means 31 coupled to the switch 29 and operable thereby to produce a first pulse of predetermined duration, second circuit means 32 coupled to the switch 30 and operable thereby to produce a second pulse of shorter duration than the first, a two-state switching circuit 33 connected to the circuit means 31 and 32 by an AND circuit 34, and output means 35 operable by the switching circuit 33 to transmit a control signal to the braking means via the OR circuit 22 when the first and second pulses are detected simultaneously by the AND circuit 34. Each of the speed sensing means is similarly constructed and arranged, but each has its own "critical speed" determined by the ratio of the spacing of the sensing switches to the duration of the first pulse from its first circuit means.

The sensing switches 29 and 30 are reed switches which are operable by a permanent magnet 36 carried by the elevator car 15. It will be understood, however, that the switches 29 and 30 may take other forms, and moreover, they need not be contact making switches at all; the switches could, for example, be photoconductive devices, capacitance devices, or any means for changing an electrical condition in accordance with the passage of the elevator car. The two reed switches are shown at 29 and 30. The first circuit means 31 (FIGURE 1) comprises transistors 37 and 38 connected in a monostable multivibrator circuit having an impedance timing network constituted by capacitor 39 and resistors 40, 41 and 42, 41 being a triming resistor and resistor 42 being normally short-circuited by a manually operated switch 43 for the purpose described hereinafter. Resistor 44 and its smoothing capacitor 45 form the reverse-biassing emitter-base circuit for both transistors 37 and 38. Resistor 46 is the base bias resistor for transistor 37, and resistors 47 and 48 are the driving and current limiting base resistors for the same transistor. The two transistors have collector resistors 49 and 50 respectively, and a diode 51 is connected in the collector circuit of transistor 37 to prevent the accidental triggering of the multivibrator by positive spikes appearing in the line voltage. A capacitor 52 forms with the resistor 47 a delay network which prevents for a short time any second negative pulse from appearing on the base of transistor 37 through bouncing of the contacts of reed switch 29. Resistor 53 is a current limiting resistor which protects the contacts of the reed switch 29.

The second circuit means 33 (FIGURE 1) comprises a pair of transistors 54 and 55 similarly connected in a monostable multivibrator circuit having an impedance timing network formed by capacitor 56 and resistor 71. The multivibrator circuit includes a reverse-biassing emitter-base circuit formed by resistor 58 and capacitor 59, and transistor 54 has a base bias resistor 60, and driving and current limiting base resistors 61, 62. In the collector circuit of transistor 54 is a collector resistor 63 and a diode 64 for preventing the accidental triggering of the multivibrator by positive spikes in the line voltage. The energizing coil of relay 65 forms the load of the transistor 55; a quenching diode 66 across the energizing coil limits the voltage across the transistor 55 during turn-off, to the supply voltage. A resistor 67 shunts the current passing through the relay coil when transistor 55 is held OFF, in order to guarantee that the relay contacts will open.

The AND circuit 34 is formed by diodes 68 and 69; if the anode of either diode is maintained at a very low negative voltage, then current will flow from the negative supply terminal 70 through a resistor 65 and forward-biassed diode 68 or 69, and the cathodes of the diodes will be maintained at a voltage below the triggering level voltage of transistor 54. If a high negative voltage is applied simultaneously to the anodes of both diodes 68 and 69, then they will stop conducting and a high negative voltage will appear in their cathodes through the resistor 65; this voltage will be above the triggering level of transistor 54, which will then switch ON. Resistor 72 is a low value resistor which keeps the voltage in the cathode of diode 69 well below the triggering level of transistor 54. Resistor 73 is the discharging resistor for the capacitor 74, which is the coupling capacitor for diode 69. The capacitor 75 forms with the resistor 73 a delay network which prevents for a short time any second negative pulse to appear in the coupling capacitor 74 through bouncing of the contacts of reed switch 30. A resistor 76 is a current limiting resistor which protects the contacts of the reed switch 30.

In the normal condition of the circuit, as illustrated, transistor 38 is held ON by the base current through resistors 40 and 41, and transistor 37 is held OFF because its base is reversed-biassed due to the biassing network of resistors 44, 46 and 48, and the low saturation voltage of transistor 38. The capacitor 39 is charged with the polarity shown. When a negative pulse is applied to the base of transistor 37 through the resistor 47, transistor 37 turns ON and capacitor 39 immediately begins to discharge through the resistors 40 and 41 and transistor 37, producing a positive voltage at the base of transistor 38. The latter is reversed-biassed and turns OFF and negative voltage through the resistors 48 and 50 holds transistor 37 ON as long as capacitor 39 discharges and holds transistor 38 OFF. The negative output voltage appearing at the collector of transistor 38 remains until the charge on capacitor 39 reverses, when transistor 38 will turn ON, removing the base drive on transistor 37, and the circuit will remain in this state until another negative pulse appears in the base of transistor 37.

In operation, if the reed switch 29 is closed by the magnet 36 carried by the elevator car, moving in the direction of the arrow shown in FIGURE 2, a negative voltage pulse will be applied to the base of transistor 37 through the resistor 47. Transistor 37 will turn ON and transistor 38 will turn OFF, producing a negative voltage pulse in the anode of diode 68. This pulse has a duration which is predetermined by the impedance timing network 39, 40 and 41. The magnet 36 will subsequently reach the reed switch 30 within a time determined by the spacing of the reed switches and the speed of the elevator car, and the contacts of reed switch 30 will close causing a negative voltage pulse of short duration to appear in the anode of diode 69. If the elevator car is moving at a speed exceeding the critical speed, the second negative voltage pulse will occur within the duration of the first negative voltage pulse, and both diodes 68 and 69 will have simultaneous negative voltage pulses in their anodes; both diodes are turned OFF and a negative voltage pulse is applied to the base of transistor 54 through resistors 65 and 61. Transistor 54 will turn ON, switching transistor 55 OFF. Consequently the relay 65 will be deenergized and the relay contacts, controlling the output circuit 35, will remain open for a time determined by the timing circuit formed by capacitor 56 and resistor 71. This time constant may be adjusted to suit particular operational requirements.

Suitable values for the components of the speed sensing circuits are as follows:

Power supply voltage _____ volts __ −18

Resistors:
40 _____ 12K
41 _____ 10K
42 _____ 5.6K
44 _____ ohms __ 100
46 _____ 10K
47 _____ 27K
48 _____ 27K
49 _____ 1.5K
50 _____ 1.5K
53 _____ ohms __ 100
65 _____ 10K
58 _____ ohms __ 68
60 _____ 6.8K
61 _____ 10K
62 _____ 15K
63 _____ 1K
67 _____ 2.2K
71 _____ 10K
72 _____ ohms __ 560
73 _____ 10K
76 _____ ohms __ 100

Capacitors:
39 _____ microfarads __ 4.7
45 _____ do ____ 1
52 _____ do ____ 0.1
56 _____ do ____ 100
59 _____ do ____ 1
74 _____ do ____ .01
75 _____ do ____ 0.1

Transistors:
37 _____ 2N404 type
38 _____ 2N404A type
54 _____ 2N404 type
55 _____ 2N404A type Diodes:
51 _____ 1N457 type
64 _____ 1N457 type
66 _____ 1N457 type
68 _____ 1N457 type
69 _____ 1N457 type Relay 65
(designed to pick up with 12 volts.) ____ ohms __ 1500

Opening of the contacts of relay 65 causes the necessary circuit to be applied to the braking means in the control means 17, via the OR circuit 22, thus effecting an emergency braking operation on the elevator car. It will be noted that since the contacts of relay 65 are normally opened, the system will fail-safe in case of power supply failure.

If the contacts of reed switch 30 are closed after the termination of the first pulse, then the diode 69 will turn OFF briefly but the diode 68 will be forward-biassed preventing the appearance of a high negative voltage in the input of resistor 61. Thus transistor 54 will remain OFF, transistor 55 will remain ON, and the contacts of relay 65 will remain closed. The two pulses will occur simultaneously only when the magnet 36, and hence the elevator car 15, is moving at a speed high enough to cause the second reed switch to close within the duration of the first pulse.

It will be seen that when the elevator car is moving in the opposite direction so that reed switch 30 is closed before reed switch 29, the negative voltage pulse to occur first will be the pulse of very short duration, which will have expired before the reed switch 29 closes. Since the two pulses are of different durations, the speed sensing means is essentially a unidirectional device, responsive to overspeed of the elevator car, i.e. as speed exceeding the critical speed when moving in one direction only.

The manually operated switch 43 is provided for the purpose of testing the correct operation of the circuit. By opening the switch 43, the time constant of the timing network 39, 40, 41 and 42 is increased by the insertion of resistor 42 into the timing network, and so the duration of the first pulse produced by the multivibrator will be increased. In this way the sensing means will respond to speeds less than the critical speed and so it becomes unnecessary to overspeed the elevator in order to prove the correct operation of the device.

The circuit described above is suitable for operational speeds of from 100 feet per minute to 1500 feet per minute, the duration of the first pulse being equal to 50 milliseconds, the spacing of the reed switches 29 and 30 being one inch per 100 feet per minute of speed, and the time during which the contacts of relays 65 will stay open being approximately 0.8 second.

As previously mentioned, each of the speed sensing means is adjusted to respond to a speed exceeding a critical speed selected for the particular position at which the sensing means is located in the elevator shaft. FIGURE 3 is a speed/distance diagram illustrating the conditions in which a particular sensing means will or will not respond to the passage of the elevator car. Curve A is a plot of the maximum permissible speed, or critical speed, against distance along the elevator shaft. At positions L1, L2 and L3 are located speed sensing means of the kind described above, which will respond to speeds exceeding critical speeds V1, V2, and V3 respectively. Curve B represents the motion of a decelerating car whose speed is always less than the critical speed, the curve B lying below curve A. In this case the car will proceed to the position $L_0$ of the limit switch, which is simply a position-responsive switch, and which will actuate the braking control means for the elevator motor in known manner. Curve C illustrates the motion of an elevator car which is initially moving at a speed less than the critical speed; the sensing means at position $L_1$ does not operate since at this position the critical speed has not been reached. By the time the elevator car reaches position $L_2$ it is travelling faster than the critical speed for that position, and hence the speed sensing means at position $L_2$ will operate to effect an emergency braking action on the elevator car. Curve D illustrates the motion of the elevator car in the opposite direction. Although the curve D lies well above curve A, there is no likelihood that the sensing means will be operated since these are essentially unidirectional, at least in the range of all car speeds likely to be encountered in practice. The elevator car is thus permitted to accelerate in a "safe" direction at relatively high speeds without actuating the braking means.

Although the speed monitoring means are located adjacent to the ends of the elevator shaft in the embodiment described, to serve as safety devices, similar means may be located in any regions of the shaft for monitoring the speed of the car in those regions.

Moreover, although the invention has been described particularly with reference to an elevator system, it is to be understood that the invention is applicable to other systems in which it is required to monitor the speed of a moving body, and particularly to detect overspeed of the body in a predetermined direction for braking, control or indicating purposes.

What I claim as my invention is:

1. Control means responsive to overspeed of a body moving in a predetermined direction along a path towards a limit position, comprising a plurality of unidirectional speed sensing means spaced apart along said path at predetermined positions in advance of the limit position, the speed sensing means being successively operable by movement of the body past the predetermined positions at speeds in excess of respective, successively decreasing, critical speeds, an OR circuit, and braking means connected to the respective sensing means through the OR circuit, the braking means being responsive to operation of any of said sensing means for arresting movement of the body.

2. Control means according to claim 1, wherein each of the speed sensing means comprises first and second sensing switches spaced apart along the path, the first sensing switch being located at a position in advance of the second sensing switch, and the first and second sensing switches being operable successively by movement of the body past the switches, first circuit means coupled to the first sensing switch and operable thereby for producing a first pulse of predetermined duration, second circuit means coupled to the second sensing switch and operable thereby for producing a second pulse of shorter duration than the first pulse, an AND circuit, a two-state switching circuit connected to the first and second circuit means through the AND circuit, the two-state switching circuit being responsive to simultaneous occurrence of the first and second pulses for changing from a first state to a second state, and output means operable in accordance with the state of the switching circuit.

3. Control means according to claim 2, wherein the two-state switching circuit has a first, stable state and a second, unstable state, and wherein the output means includes a control relay which is energised when the switching circuit is in its first state and deenergised when the switching circuit changes to its second state.

4. Control means according to claim 2, wherein the first circuit means comprises a first monostable multivibrator circuit operable by the first sensing switch to change from a first, stable state to a second, unstable state, and wherein the second circuit means comprises a pulse forming circuit operable by the second sensing switch to produce said second pulse, and wherein the two-state switching circuit comprises a second mono-stable multivibrator circuit responsive to simultaneous occurrence of the first and second pulses to change from a first, stable state to a second, unstable state.

5. Control means according to claim 4, wherein the first and second sensing switches are reed switches operable by a magnet carried by the body.

6. Control means according to claim 5, wherein each of the monostable multivibrator circuits is connected to a respective said reed switch by means including a delay circuit for preventing operation of the multivibrator by closure of the reed switch within a predetermined time of a previous closure of the reed switch.

7. In an elevator system, a structure providing an elevator shaft, an elevator car mounted in the shaft, motive means for the elevator car, overspeed responsive means located in a predetermined region of the shaft for detecting movement of the car in one predetermined direction at a speed in excess of a maximum permissible speed at that region, and braking means operable by the overspeed responsive means for effecting rapid braking of the elevator car, said overspeed responsive means comprising first and second sensing switches located in said predetermined region of the shaft, the first and second sensing switches being operable in succession by passage of the elevator car along said region, first circuit means coupled to the first sensing switch and operable thereby for producing a first pulse of predetermined duration, second circuit means coupled to the second sensing switch and operable thereby for producing a second pulse of shorter duration than the first pulse, an AND circuit, a two-state switching circuit connected to the first and second circuit means through the AND circuit, the switching circuit being responsive to simultaneous occurrence of the first and second pulses for changing from a first state to a second state, and output means responsive to the state of the switching circuit.

8. An elevator system according to claim 7, wherein the first circuit means comprises a monostable multivibrator circuit having a recovery time determined by the time constant of a capacitance-resistance network, manually operable switching means being connected to by-pass a second resistance of the network, the manually operable switching means being operable for modifying the time constant of the network, and hence the duration of said first pulse, whereby to test the effectiveness of the overspeed responsive means for car speeds less than the maximum safe speed.

9. In an elevator system including an elevator shaft, an elevator car mounted in the shaft, motive means for the elevator car, and braking means for effecting rapid braking of the elevator car, the improvement comprising protective means responsive to overspeed of the elevator car moving in a predetermined direction towards a limit position, the protective means comprising a plurality of unidirectional speed sensing means spaced apart along the shaft at predetermined positions in advance of the limit position, the speed sensing means being successively operable by movement of the elevator car past the predetermined positions at speeds in excess of respective, successively decreasing, critical speeds, an OR circuit, and braking means connected to the respective sensing means through the OR circuit, the braking means being responsive to operation of any of said sensing means for arresting movement of the body.

10. An elevator system according to claim 9, wherein each of the speed sensing means comprises first and second sensing switches spaced apart along the shaft, the first sensing switch being located at a position in advance of the second sensing switch, and the first and second sensing switches being operable successively by movement of the body past the switches, first circuit means coupled to the first sensing switch and operable thereby for producing a first pulse of predetermined duration, second circuit means coupled to the second sensing switch and operable thereby for producing a second pulse of shorter duration than the first pulse, an AND circuit, a two-state switching circuit connected to the first and second circuit means through the AND circuit, the two-state switching circuit being responsive to simultaneous occurrence of the first and second pulses for changing from a first state to a second state, and braking control means operable in accordance with the state of the switching circuit.

11. An elevator system according to claim 10, wherein the two-state switching circuit has a first, stable state and a second, unstable state, and wherein the braking control means includes a control relay which is energized when the switching circuit is in its first state and deenergized when the switching circuit changes to its second state.

12. An elevator system according to claim 10, wherein the first circuit means comprises a first monostable multivibrator circuit operable by the first sensing switch to change from a first, stable state to a second, unstable state, wherein the second circuit means comprises a pulse forming circuit operable by the second sensing switch to produce said second pulse, and wherein the two-state switching circuit comprises a second monostable multivibrator circuit responsive to simultaneous occurrence of the first and second pulses to change from a first, stable state to a second, unstable state.

13. An elevator system according to claim 10, wherein the first and second sensing switches are reed switches operable by a magnet carried by the elevator car.

14. Control means responsive to overspeed of a body moving in a predetermined direction along a path, comprising first sensing means located at a first predetermined position of the path, second sensing means located at a second predetermined position of the path spaced from the first position, means carried by the body for operating the first and second sensing means, the first sensing means being operable by movement of the body past the first position to initiate a timing cycle, and the second sensing means being operable by movement of the body past the second position to produce a control signal, switching means responsive to occurrence of the control signal during the timing cycle, and control means energized by the switching means.

References Cited

UNITED STATES PATENTS

| | | | |
|---|---|---|---|
| 1,654,650 | 1/1928 | Hymans | 187—39 |
| 2,183,409 | 12/1939 | Schiebeler | 318—369 X |
| 3,415,344 | 12/1968 | Abe et al. | 187—29 |

ORIS L. RADER, Primary Examiner

W. E. DUNCANSON, Jr., Assistant Examiner

U.S. Cl. X.R.

187—39; 318—369